United States Patent [19]

Coughlan et al.

[11] Patent Number: 5,022,812
[45] Date of Patent: Jun. 11, 1991

[54] SMALL ALL TERRAIN MOBILE ROBOT

[75] Inventors: Joel B. Coughlan, Bonnerville County, Id.; Kenneth A. Farnstrom, Anderson County, Tenn.; Howard W. Harvey, Roane County, Tenn.; R. Glen Upton, Anderson County, Tenn.; John R. White, Roane County, Tenn.; Kenneth L. Walker, Anderson County, Tenn.

[73] Assignee: Remotec, Inc., Oak Ridge, Tenn.

[21] Appl. No.: 536,142

[22] Filed: Jun. 11, 1990

Related U.S. Application Data

[63] Continuation-in-part of Ser. No. 248,973, Sep. 26, 1988, Pat. No. 4,932,831.

[51] Int. Cl.$^5$ .............................................. B66C 9/00
[52] U.S. Cl. ................................. 414/729; 180/9.32; 280/5.22; 901/1
[58] Field of Search ............... 414/729, 732; 901/1; 180/8.1, 8.1, 9.32, 9.62, 2.1, 6.5; 280/5.22, 5.28

[56] References Cited

U.S. PATENT DOCUMENTS

| | | | |
|---|---|---|---|
| 1,592,654 | 7/1926 | Bremer | 180/9.32 |
| 3,166,138 | 1/1965 | Dunn, Jr. | 280/5.22 |
| 3,288,234 | 11/1966 | Feliz | 280/5.22 |
| 4,932,831 | 6/1990 | White et al. | 414/732 |

*Primary Examiner*—Robert J. Spar
*Assistant Examiner*—Donald W. Underwood
*Attorney, Agent, or Firm*—Pitts and Brittian

[57] ABSTRACT

A remotely controlled vehicle for traversing various terrains to accomplish missions in a hostile environment. This vehicle is sufficiently small so as to permit introduction into the environment through a manway, and is designed so that it can be operated while submersed. It has a main chassis with rotatable tracks on either side thereof that supports the vehicle. Auxiliary chassis in a forward and rearward direction also carry tracks on either side, with theses auxiliary chassis being pivotable to raised or lowered positions to accomplish movement over uneven terrain or for storage of the vehicle. All of the tracks on one side of the vehicle (main chassis track and tracks on forward and rearward auxiliary chassis) are rotated by a single drive mechanism within the main chassis, with the rotation of the tracks on the second side being rotated by another internal main drive mechanism. The pivotal movement of each of the auxiliary chassis is controlled by a separate drive mechanism. The main chassis carries a deployable arm including a shoulder, an upper arm portion, an elbow, a forearm portion and drives for the shoulder and elbow units. The forearm portion is designed to releasably carry various "tools" for carrying out operations with the vehicle. The drive mechanism have planetary gear units to provide desired speed and torque, and output shafts of each are provided with seals to prevent damage to bearings and other portions when submerged operation is carried out.

9 Claims, 8 Drawing Sheets

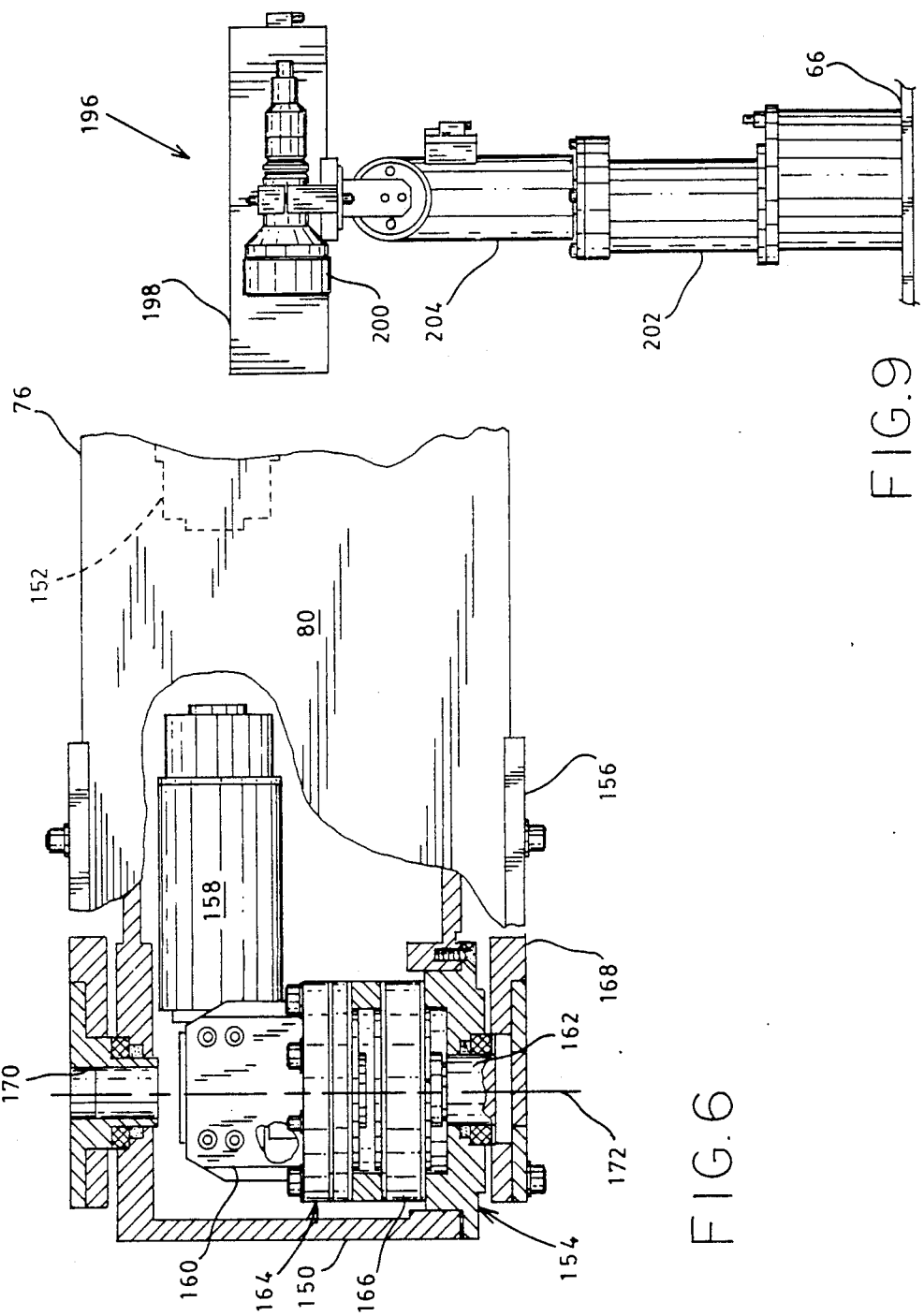

SMALL ALL TERRAIN MOBILE ROBOT

This is a Continuation-in-Part application based upon parent application Ser. No. 248,973, filed on Sept. 26, 1988, and now U.S. Pat. No. 4,932,831 issued on June 12, 1990.

DESCRIPTION

1. Technical Field

The present invention relates generally to a vehicle which is remotely controlled by cable or radio, and more particularly to such a vehicle which can be used to move in a potentially hostile environment where there is insufficient space for the manipulation of larger devices.

2. Background Art

As discussed in the afore-cited parent patent application, now U.S. Pat. No. 4,932,831, there are many environments in which the local situation would be hazardous to human beings. One such environment is found in the locales where nuclear radiation may be at high levels. This would include in and around nuclear plants, radioisotope processing facilities, etc. For example, it is often necessary to inspect equipment in these environments, and perform repairs if necessary. Typical of such applications is the waste sludge phase separator tank at the Susquehanna plant of Pennsylvania Power and Light Company where it is periodically necessary to unplug flow educator nozzles in the interior walls thereof. At present this operation is performed by workers who are lowered into the tank and use a hydrolaser inserted into each nozzle, one at a time.

Other environments in which it is very hazardous for intervention by human beings are those associated with military or paramilitary actions, various forms of security including actions involved with fires and explosions, etc. Of course, included in paramilitary actions are those being performed by police at the various levels of government.

An all terrain vehicle mobile robot was developed to be used in these hostile environments. This robot, named ANDROS, is described fully in the above-cited patent, the teachings thereof being incorporated herein by reference. Basically, this ANDROS vehicle had a body moved by a pair of tracks, one on each side, that are independently operated for manipulation. Further, there are additional track units on the forward and rearward portions that are capable of being elevated or depressed such that the vehicle can move over uneven terrain. The vehicle carries lights, sighting equipment, and any desired equipment to accomplish a given mission. This equipment is generally mounted upon the end of an arm unit that can move in most directions, there being a pivotal shoulder unit, an elbow unit and a wrist unit. Power is supplied either through a cable (and tether) or an on-board power pack. Operation controls are transmitted either through the cable or by radio-type transmission.

This vehicle, while serving as an adequate solution to many of the problems of remote operation in a hostile environment, has at least two main disadvantages: it is too large for use in certain tanks and passageways; and it could not operate well while submerged since bearings had inadequate liquid impervious seals. As to size, it was desired for some applications to have the capability of being inserted into tanks, etc. through a restricted opening. Also, a reduced size was desired in order to simplify the transportation of the vehicle to a site for subsequent use. While the matter of preventing entry of liquids into bearings, etc, could be satisfied by appropriate seals, the components of the large ANDROS would require extremely large seals of special design and thus would be expensive. Some of the components of the large ANDROS were of such design as to prevent just a reduction in size to accomplish the same applications.

Accordingly, it is an object of the present invention to provide a remotely operated all terrain vehicle having a variety of capabilities while being sufficiently small so as to be easily transported.

It is another object of the present invention to provide a remotely operated all terrain vehicle that is sufficiently small such that it can be fitted through openings into tanks and the like for use in inspection and maintenance operations.

A further object of the present invention is to provide an all terrain vehicle that can be operated in environments where the components may be immersed in liquids, either corrosive or non-corrosive, without significant damage to bearings on primary rotating parts thereof.

Also, it is an object of the present invention to provide a simplified arm unit for an all terrain vehicle to which a wide variety of "operating" elements can be releasably attached for accomplishing a variety of operations with the vehicle.

These and other objects of the present invention will become apparent upon a consideration of the drawings shown and discussed below, together with a complete description of the improved vehicle.

DISCLOSURE OF THE INVENTION

In accordance with the present invention, this remote all terrain vehicle has a main chassis with a pair of sprocket wheels on each side thereof. Endless tracks are supported on these sprocket wheels and provide the main means for movement of the vehicle. In addition, there are two auxiliary chassis, one mounted at the front and one mounted at the rear of the main chassis, with each of these chassis also carrying a pair of sprocket wheels for driving appropriate tracks. A single drive system is used to drive the tracks on each side of the vehicle so as to provide for manipulation of the vehicle. The auxiliary chassis can be raised or lowered angularly so as to adapt the device for movement across terrain of various configurations and containing various obstacles (or to reduce the volume occupied by the vehicle). The forward auxiliary chassis is moved up or down with a single drive system, and a separate drive system moves the rear auxiliary chassis up or down. These drive systems are directly coupled to one side of each of their respective auxiliary chassis, and a cross member transmits the motion to the opposite side of each. The shafts of the drive systems for vehicle movement and for movement of the auxiliary chassis are of reduced size thereby permitting the use of appropriate seals such that the vehicle can be operated in a submerged condition.

Mounted atop the main chassis is a simplified arm unit having a shoulder joint and an elbow joint that are operated by identical (and interchangeable) drive systems. The forearm portion of the arm unit is adapted to receive any one of a number of operating devices, such as tongs, illumination devices, etc. Provision can be made, if desired, for rotation of the shoulder unit to permit movement of the arm toward the sides of the vehicle. Power is supplied either through a battery pack or cable, and controls are communicated in any suitable manner from a remote station.

BRIEF DESCRIPTION OF THE DRAWINGS

FIG. 6 is a partial cross sectional view of a drive system used for the shoulder joint and the elbow joint of the arm unit of FIG. 5, taken at 6—6 of that figure.

FIG. 9 is a side elevational view of a typical viewing means for mounting on top of the body of the vehicle of FIG. 1.

BEST MODE FOR CARRYING OUT THE INVENTION

Figure 1:
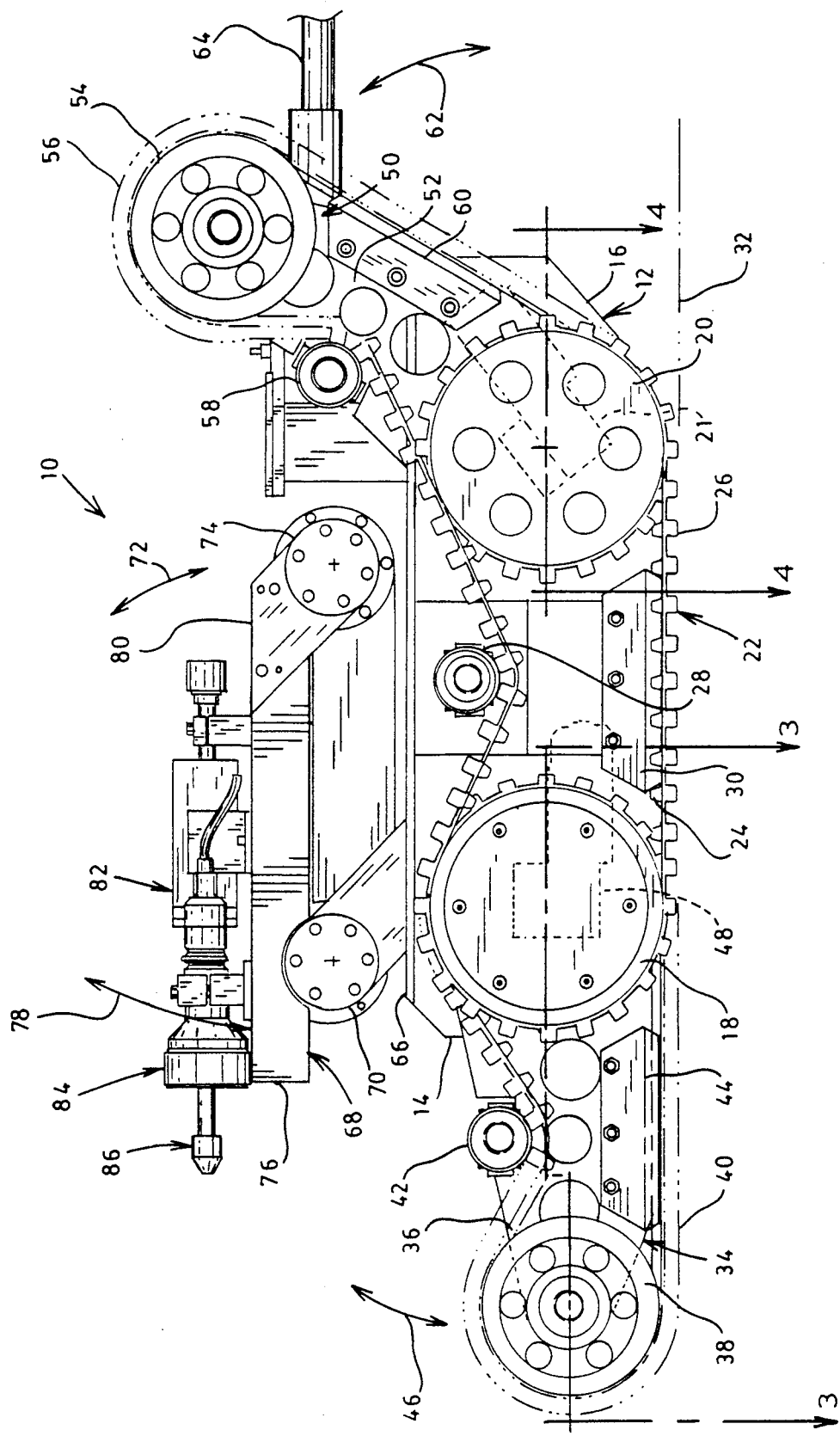
FIG. 1 is a side elevation of one embodiment of a small all terrain remote vehicle as developed to accomplish the above-stated objects.

The all terrain remote vehicle of the present invention is illustrated, with a typical compliment of operating units, generally at 10 in FIGS. 1 (a side elevation) and 2 (a top view). It has a central body 12 that defines a forward end 14 and a rearward end 16. Rotatably mounted on a left side of the vehicle (based upon the forward and rearward direction) are a pair of sprocket wheels 18, 20, with corresponding wheels 18' and 20' being positioned on the right side. These are double wheels, i.e., they can accept two belted tracks for purposes discussed hereinafter. The system for rotation of these wheels is indicated at 21, and will be discussed in connection with FIG. 4. The wheels 18, 20 support a first endless track 22, this being a belted track with both internal cleats 24 and external cleats 26. Typically this is a Kevlar belt onto which internal and external urethane cleats have been molded. An idler wheel 28 maintains tension on the track 22, and a skid 30 maintains the external cleats 26 in contact with any support surface 32. A similar construction exists on the right side of the vehicle with track 22' and idler wheel 28'.

The body 12 also supports an articulated auxiliary chassis 34 at a forward end, this auxiliary chassis being pivotable about the axis 45 of wheels 18, 18' to positions ninety degrees up and down with respect to the horizontal. It has a pair of arms 36, 36', each of which carry a single sprocket wheel 38, 38' at their distal ends. These arms have an interconnection in the form of a torsion tube as discussed in connection with FIG. 3. Auxiliary endless tracks 40, 40' are carried by the wheels 38, 38' and corresponding second portions on sprocket wheels 18, 18, (see FIG. 3). Idler wheels 42, 42' are provided to maintain tension on the tracks 40, 40', and a skid 44 (on each side) is provided to maintain the track 40 in contact with any surface that is engaged. This forward auxiliary chassis 34 can be pivoted around the axis 45 of the sprockets 18, 18' in directions indicated by double-headed arrow 46 by drive means generally indicated at 48 and described further in regard to FIG. 3.

Figure 3:
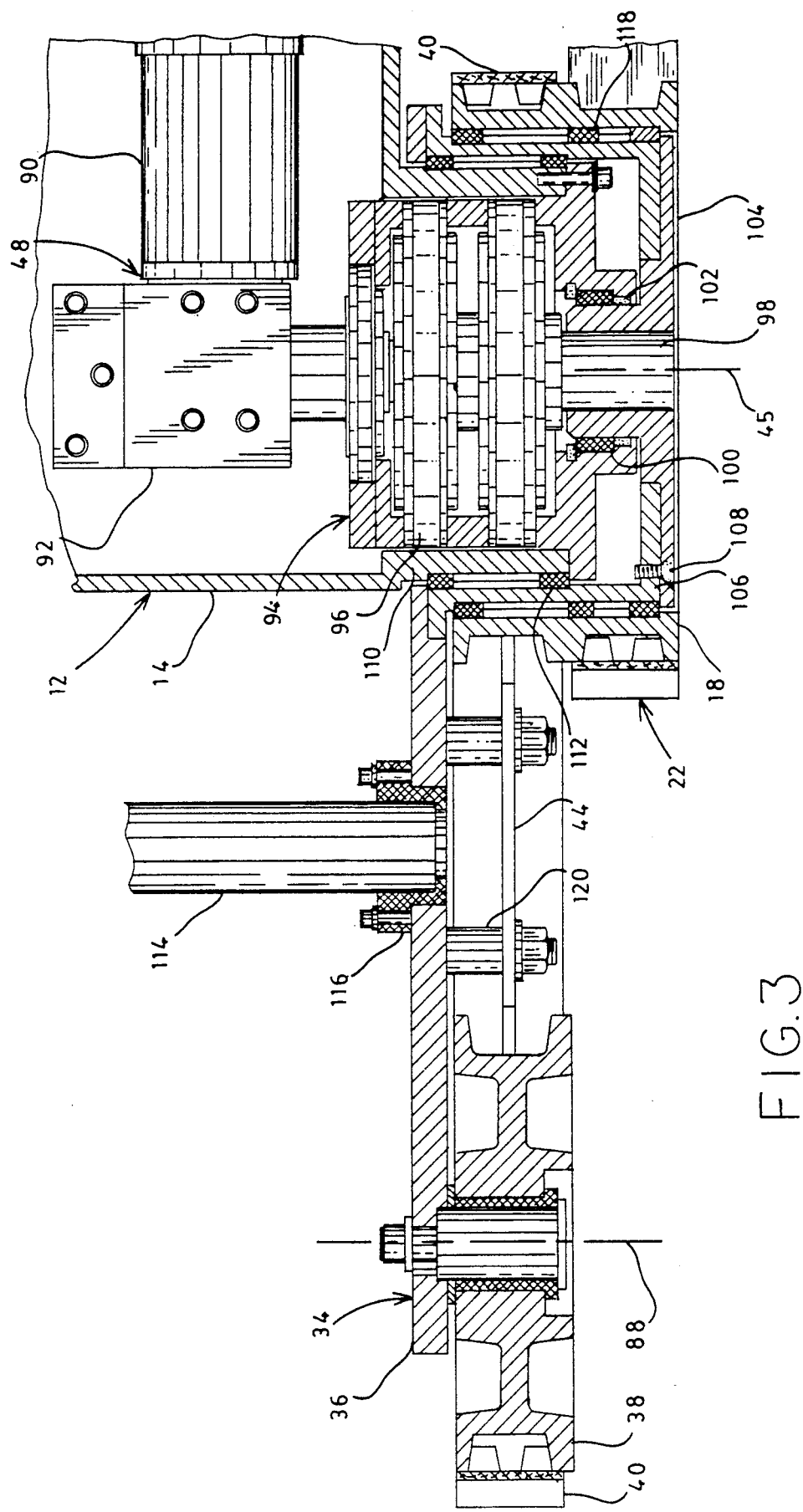
FIG. 3 is a partial cross sectional view of a drive system for use in the pivotal movement of the auxiliary chassis units of the vehicle of FIGS. 1 and 2, taken at 3—3 in FIG. 1.
Figure 4:
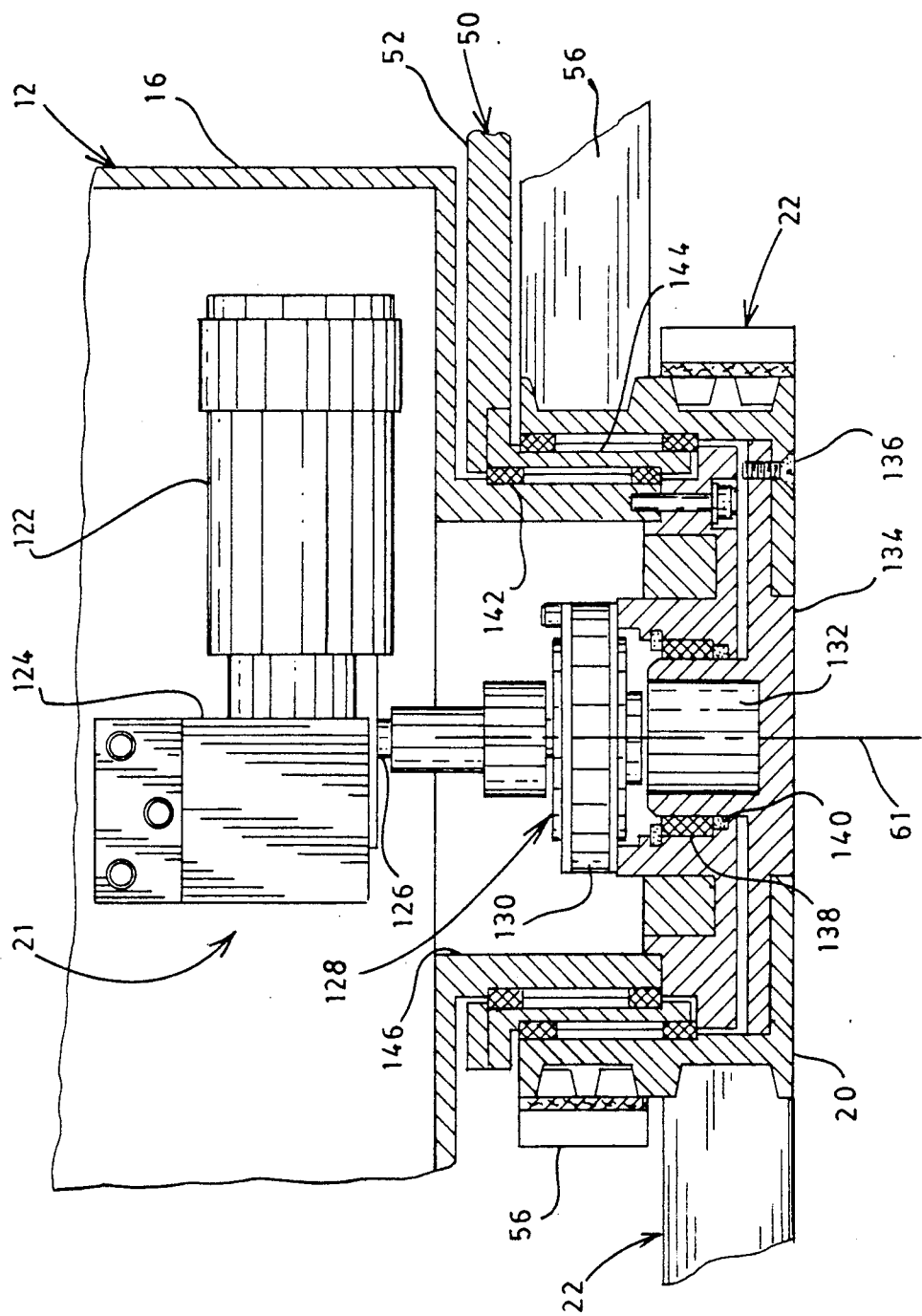
FIG. 4 is a partial cross sectional view of a drive system for use in driving the tracks of the vehicle of FIGS. 1 and 2, taken at 4—4 in FIG. 1.

A similar articulated auxiliary chassis 50 is carried at the rear 16 of the body 12. It, too, has a pair of arms 52, 52' interconnected with a torsion tube (see discussion regarding FIG. 3) that each carry at their outboard (distal) ends a sprocket wheel 54, 54'. A further endless belt 56, 56' on each side embracing sprocket wheels 20 and 54 (and 20' and 54'), as shown in FIG. 4, is maintained tight by idler wheels 58, 58', and there is a skid 60 similar to the skid of the forward auxiliary chassis 34. This auxiliary chassis 50, which can pivot up or down around the axis 61 of the sprocket wheels 20, 20' can be moved in a direction as indicated by the double-headed arrow 62 so as to position the auxiliary chassis either above or below the main chassis, or at any position therebetween.

Typically, power is brought to the vehicle through a cable 64. Usually the power at the source is 120 volts; thus, a convertor (not shown) would be positioned within the body 12. Alternatively, there can be a battery pack (not shown) mounted within the body 12. Control signals can also be sent to the vehicle over this cable or can be transmitted via radio communication. In this respect, this vehicle is similar to that disclosed in the above-cited patent. Preferably any extra length of cable needed for the vehicle will be carried by a separate cable reel (see FIG. 7) so as to minimize the size of the vehicle.

Figure 2:
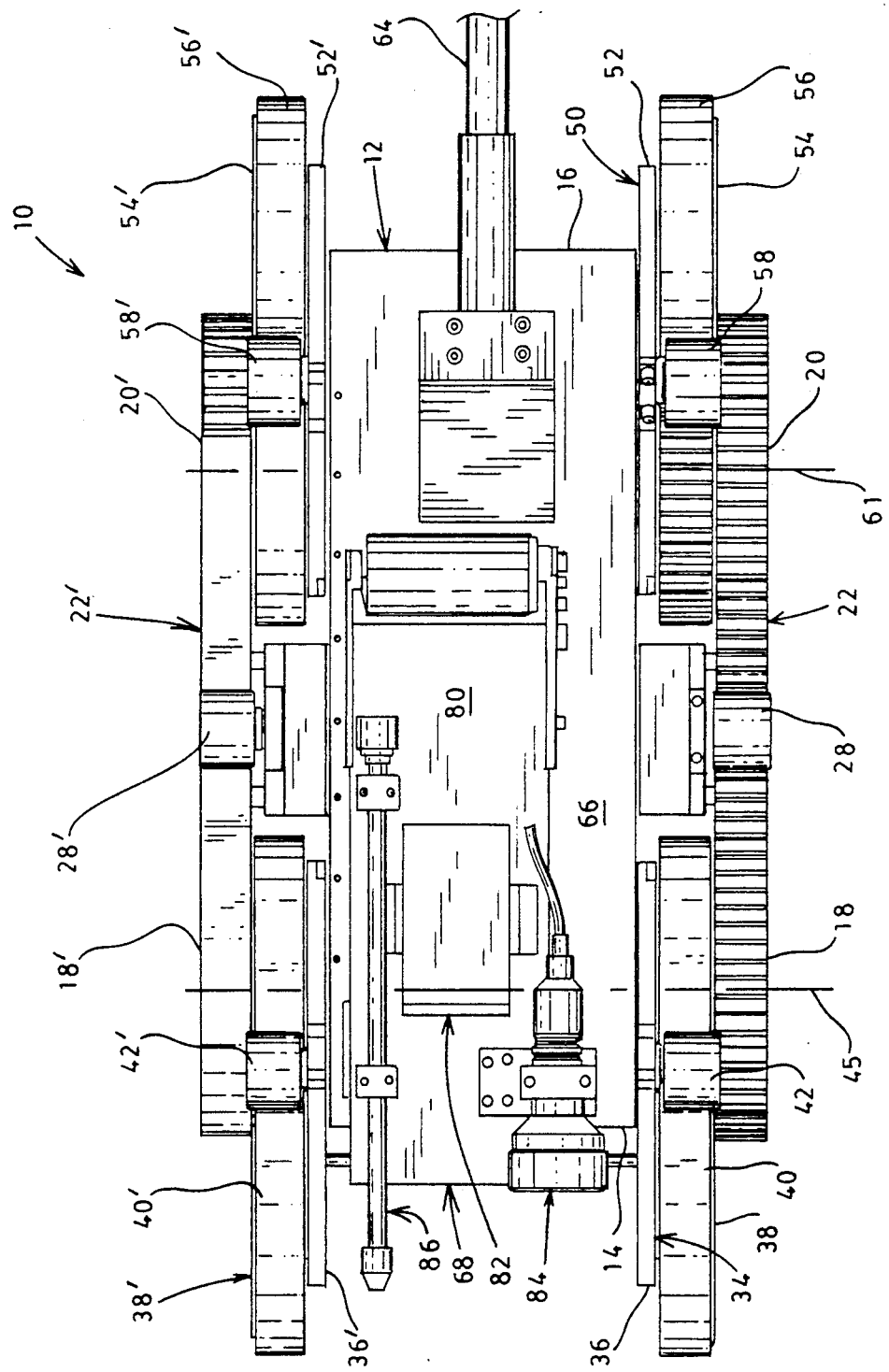
FIG. 2 is a top view of the embodiment of the vehicle illustrated in FIG. 1.
Figure 8:
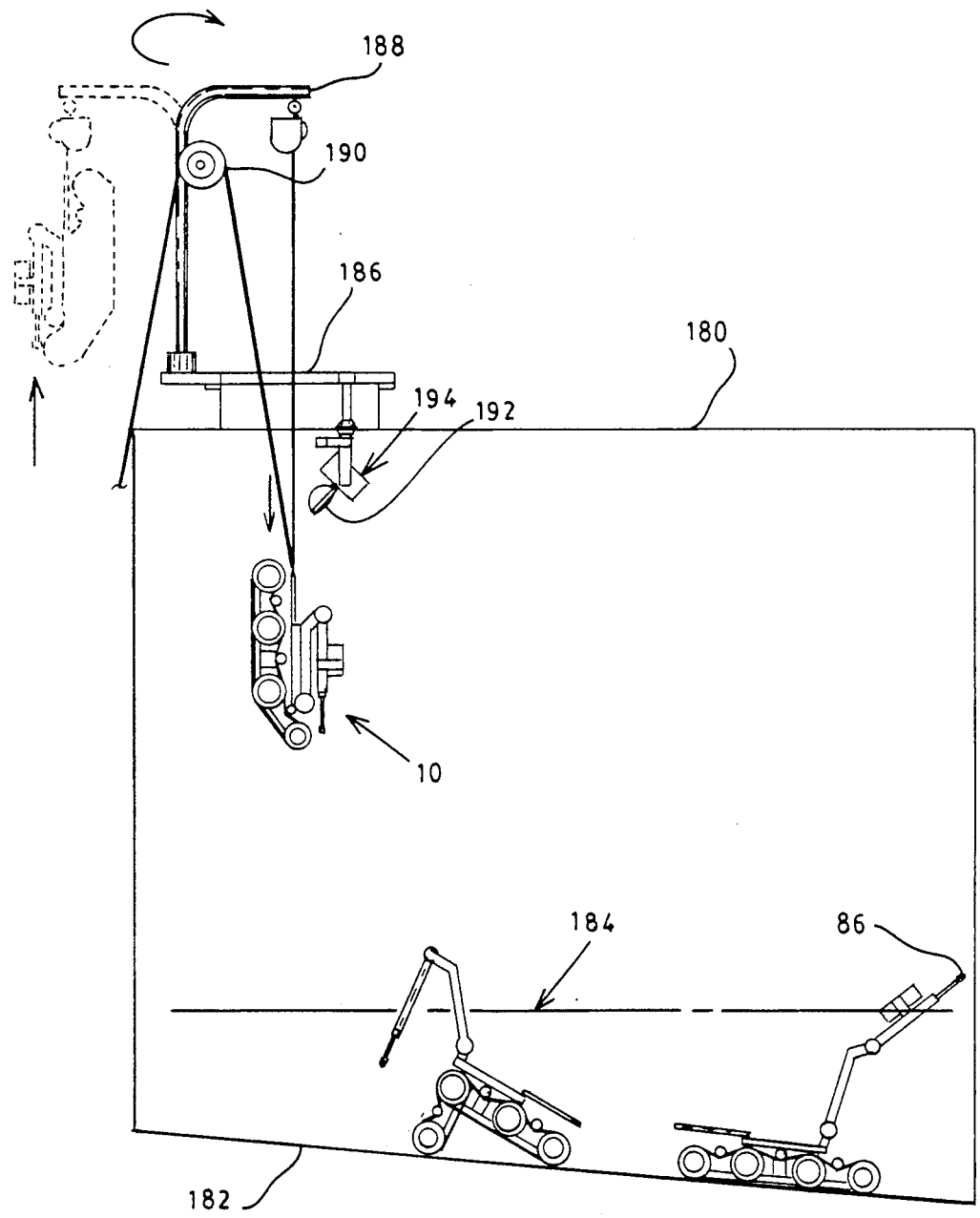
FIG. 8 is a schematic drawing depicting use of the present invention within a tank or the like where access is through a restricted opening, the vehicle being illustrated with the auxiliary chassis deployed in different positions.

Mounted to a top cover 66 of the body 12 is a remotely manipulated arm unit 68. This arm has a shoulder unit 70 permitting movement (typically 230 degrees total) in a direction indicated by the double headed arrow 72. In addition, there is an elbow unit 74 such that the forearm portion 76 can be moved (typically 210 degrees total) in a direction indicated by the double headed arrow 78. FIG. 8 depicts this arm in various orientations. These motions are accomplished by drive means that are described with regard to FIG. 6, with greater detail of the arm unit being given with regard to FIG. 5. The forearm portion 76 has a top surface 80 for the mounting of any desired "operating device", this operating device being different for different uses of the present invention. The different operating devices that would be useful will be known to persons skilled in the art. In the embodiment depicted in FIGS. 1 and 2, there is a TV camera 82 for the viewing of areas directly ahead of the end of the forearm portion. This requires a light means 84 to achieve proper illumination. Further, this embodiment has a hydrolaser 86 with this also being directed by the aim of the forearm 76. In some embodiments, at least a portion of these components mounted on the forearm portion might be replaced with a tong unit to grasp objects. Any electrical systems of these attached devices would be connected into the electrical wiring of the vehicle via the use of plug-in modules or the like. Further, wherever possible, permanent wiring components are contained within the various body and arm units so as to give physical protection.

A major distinction between the vehicle of the present invention from that of the above-cited patent is the construction of the driving portions to manipulate the auxiliary chassis and for the basic driving of the vehicle over a given surface. Referring now to FIG. 3, shown therein is a cross sectional view of the drive means 48 for raising and lowering of the forward auxiliary chassis 34. Although this is for the forward auxiliary chassis, an identical unit is positioned on the opposite side of the vehicle near the rearward portion thereof for the pivotal movement of the rearward auxiliary chassis. It can be seen in this figure that the sprocket wheel 38, which carries the forward end of the track 40, is rotatably mounted at axis 88 at the outboard end of the arm 36.

Actual movement of the arm 36 (and thus the auxiliary chassis 34) is carried out by a drive means that includes a motor 90 suitably mounted within the body 12, a direction-changing transmission 92 and a gear train unit 94. This gear train unit 94 utilizes a plurality of planetary gear units, such as indicated at 96, to provide the desired output speed and torque of an output shaft 98. Typically the torque provided by this drive means is about 4000 in. lb. which is more than adequate for lifting the vehicle. This shaft is journalled in appropriate bearings means 100, with a seal means 102 to exclude liquid from the bearings. This construction significantly reduces the size of the required seal means. The shaft, which may be splined, is drivingly connected to a drum made up of an output plate 104 and a cylinder 106 that are typically releasably connected using a plurality of fasteners as indicated at 108. This drum, in turn, is connected to the arm 36 by any suitable means (not shown, but which are typically threaded fasteners) so that as the shaft 98 is rotated, the drum can rotate about an extension 110 of the body 12 with bearing units 112 interposed therebetween. By this construction, the forward auxiliary chassis 34 can be raised or lowered with respect to the body 12. Although this motion is directly imparted to the arm 36, it is also imparted to the second arm 36' of the forward auxiliary chassis 34 through a torsion tube 114 attached to the arm 36 at a point 116 intermediate the outboard end and the end that pivots about the axis 45. Thus, as arm 36 is moved up or down, the second arm 36' is moved accordingly. While this mechanism is indicated as being on the left side of the vehicle, it could be positioned at the right side if the position of the main drive system (discussed below) is moved to the opposite side. This pivotal movement of the forward auxiliary chassis is independent from any motion of the tracks 40, 40' of the forward auxiliary chassis and the main drive tracks 22, 22'. These motions are isolated by having the sprocket wheels 18, 18' rotatable about the axis 45 by supporting the wheels 18, 18' from the drum 106 by bearings 118, as shown.

In this FIG. 3 it can be seen that the skid 44 is mounted from the arm 36 through the use of support means 120.

Details of the main drive means 21 for the vehicle is illustrated in the partial cross section shown in FIG. 4. This includes a motor means 122 suitably mounted within the body 12 and a direction-changing transmission unit 124 having an output shaft 126 connected to a gear unit 128. This gear unit is made up of one or more planetary gear components 130, the number and gear ratios of each chosen to give the desired rotational speed and torque to an output shaft 132. Typically speeds from 0 to about sixteen in./sec. torque of and 270 in. lb. are available. An output hub 134 is attached to this output shaft by any suitable means, and the hub is releasably attached to the sprocket wheel 20 as with fasteners 136. These fasteners permit a disengagement of the sprocket 20 from the output hub 134 thereby permitting the vehicle to be moved (e.g., towed) if there is some impairment to the drive mechanism 21, etc. It can be seen that the output hub 134 is supported in appropriate bearing means 138, and a seal means 140 prevents damaging of the bearing means by any environment (as when the vehicle is submerged).

With regard to this construction, the rearward auxiliary chassis is permitted to pivot about axis 61 by means of bearing means 142 that separate its drum 144 from a cylindrical projection 146 of the body 12. This pivotal movement is controlled by a second drive means, identical to that shown in FIG. 3, located on the opposite side (the right side) of the vehicle.

From the foregoing, it will be understood by persons skilled in the art that the two mechanisms (48) for manipulating the two auxiliary chassis are at diagonally-located positions within the main chassis (the body 12), with the main drive means (21) then being in the other diagonally-located positions within the body. With this arrangement, one main drive means gives rise to rotation of the tracks (22, 40 and 56, for example) on one side of the vehicle, and the main drive means on the other side gives rise to rotation of the tracks on that second side. Similarly, one of the auxiliary chassis operating means, as discussed above, operates one auxiliary chassis and the second operating means on the opposite side of the vehicle 10 operates the second auxiliary chassis. Thus, at each end of the body there is one main drive means and one auxiliary chassis operating means.

Figure 5:
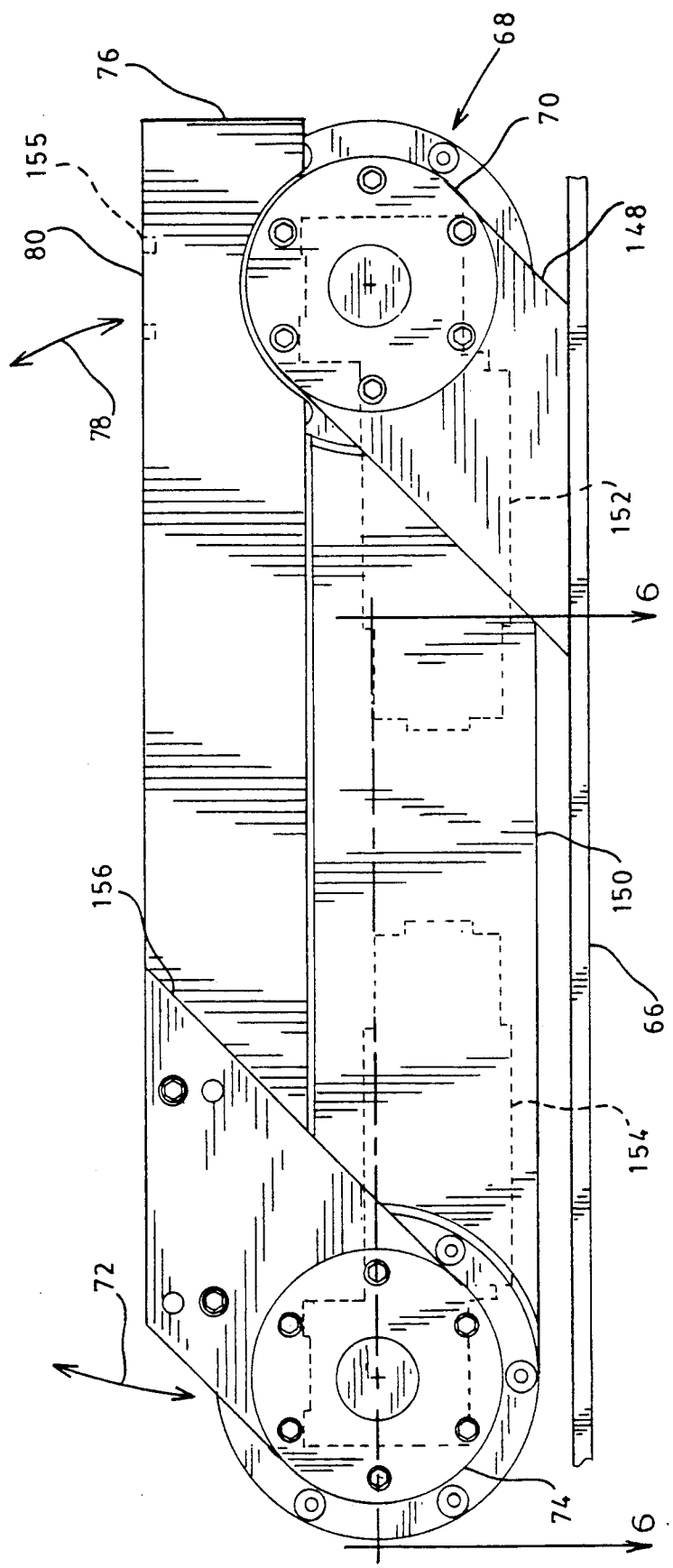
FIG. 5 is a side elevation of an arm unit of the vehicle illustrated in FIGS. 1 and 2.

As pointed out above, another modification that has been made to reduce the size and weight of the vehicle is the redesign of the articulated arm 68. A side elevation of this arm is shown in FIG. 5 (the orientation is opposite that shown in FIGS. 1 and 2). The shoulder unit 70 is attached to the top 66 of the body by a suitable bracket 148. In the embodiment illustrated, this shoulder unit does not rotate about a vertical axis; however, if a suitable rotation means (not shown) is incorporated into the bracket 148, this degree of movement can be accomplished. The upper arm portion 150 is raised (or lowered) in a direction indicated by the double-headed arrow 72 by a motor drive means 152 mounted within the upper arm portion. In a like manner, an identical motor drive means 154 within the upper arm portion causes the forearm portion 76 (which is attached to the elbow unit with a bracket 156) to move in the directions indicated by the double-headed arrow 78. Details of the two motor drive means 152 and 154 are given in FIG. 6. As discussed above, various types of equipment can be attached to the top surface 80 of the forearm 76 using conventional releasable connecting means (such as threaded fasteners to engage with threaded receptors 155). If desired, electrical connections to any component of the arm 68 can be routed through the arm components. Alternatively, such electrical supply can be brought by cable from the body 12 through an opening on the axis of the shoulder unit 70 and the elbow unit 74 (see FIG. 6).

A cross sectional view of the elbow unit 154 is shown in FIG. 6. The movement of the elbow unit is effected by a motor 158 that, through a direction changing transmission 160, drives an output shaft 162 through a gear means 164 that has one or more planetary gear units as indicated at 166. The gear ratio and the number of planetary gear units are selected to achieve a desired speed and torque of the output shaft. Typically this drive means provides variable speed from 0 to three rpm with a stall force of 3000 in. lb. This output shaft 162 is fastened by any suitable means (e.g., by a pin) to an output flange 168 to which the bracket 156 is attached. This construction permits desired pivotal movement of the forearm portion 76 relative to the upper arm portion 150. This figure illustrates an opening at 170 for admittance of wiring to the motor 158 along the elbow pivot axis 172.

Since the motor drive means 152 for the shoulder unit 70 is identical (and interchangeable) with that for the elbow 74, no description is given herein.

Figure 7:
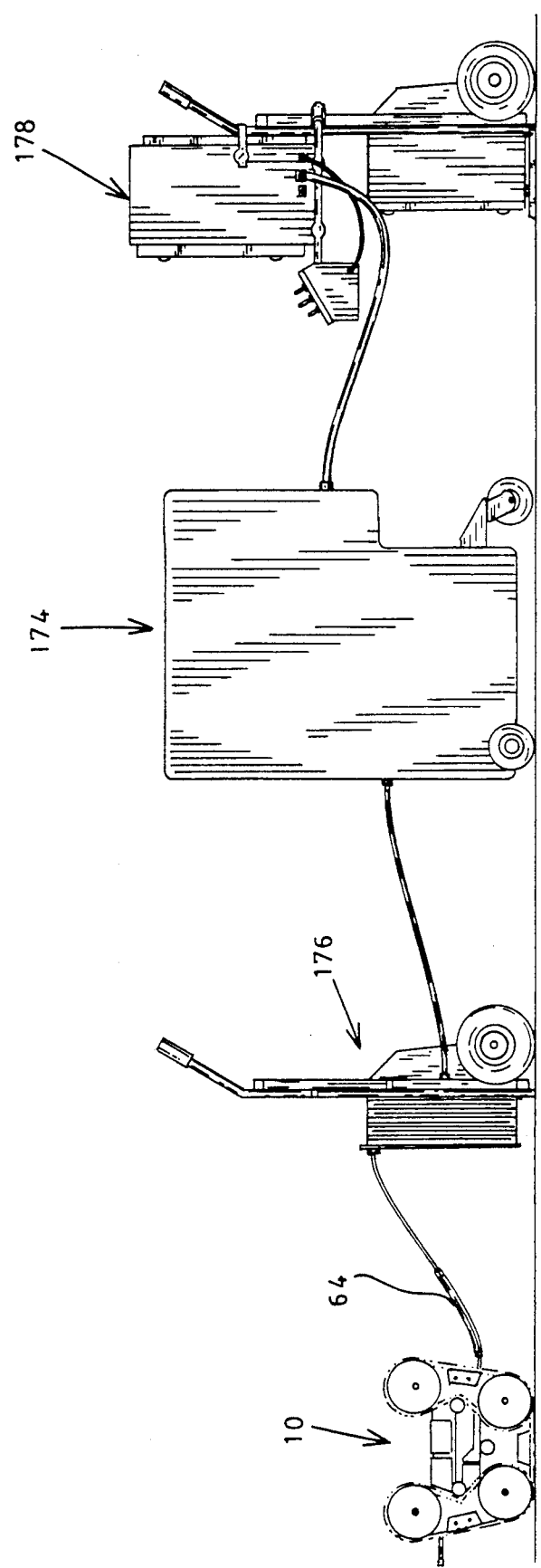
FIG. 7 is a schematic drawing illustrating a complete system associated with the vehicle of FIGS. 1 and 2 showing a transport enclosure, an auxiliary cable reel and a control station.

When the present invention is used, there are supplemental pieces of equipment typically that accompany the vehicle. These are illustrated in FIG. 7. One such supplemental piece is a transport housing or containment box 174 in which the vehicle 10 is moved to and from the site. This is particularly needed when the vehicle becomes contaminated through use. Typically the vehicle 10 will fit within this containment box when the forward and rearward auxiliary chassis portions are elevated to the most upright positions. Another piece is a portable cable reel 176 which carries a sufficient length of the cable 64 such that the vehicle can move to any desired location at the site. The other main piece of supplemental equipment is, of course, a console 178 that carries the components necessary for an operator to operate and monitor performance of the vehicle. This console would include, for example, a monitor for the TV camera and any other "readout" elements to determine the operation of the vehicle.

FIG. 8 depicts a typical utilization of the present invention, i.e. the unplugging of flow educator nozzles inside a reactor water cleanup phase separator tank 180. The floor 182 of the particular tank is sloped as indicated, and the flow nozzles are located at a level indicated at 184. For this application, the vehicle 10 of the present invention is lowered through a manway 186 (typically twenty-four inches in diameter) using a pivotal hoist 188. A pulley 190 is used to carry the supply cable 64 and the hose line to the hydrolaser 86 while the vehicle is lowered to the tank floor. In this position the arm is manipulated as necessary to direct the hydrolaser at the nozzles. In order to obtain the various necessary orientations, the auxiliary chassis portions are manipulated to the orientations illustrated in this figure. General illumination can be provided by an auxiliary light source 192, and there can be a general TV camera 194 for viewing the operations in addition to the units carried by the vehicle.

For some utilizations of the present invention, it may be desirable to have an independent viewing means in addition to that potentially carried by the arm unit. Accordingly, depicted in FIG. 9 is a viewing means 196 is shown mounted from the top 66 of the body 12. This viewing means typically has a TV camera 198 and an illumination means 200. These components are mounted on a pedestal 202 using a pan-tilt unit 204 of the type shown and described in U.S. Pat. No. 4,728,839, the teachings of which are incorporated by reference. Movement of the camera and illumination means, via the pan-tilt unit is remotely controlled by signals through the control system of the vehicle as contained within the body 12.

From the foregoing it will be understood that a versatile, but small, remotely operated vehicle has been developed. The resultant vehicle has a width of about seventeen inches, and a height when the arm is "stowed" of about fourteen inches. The total length is about twenty-seven inches with the auxiliary chassis either fully up or fully down, and about forty-nine inches when the auxiliary chassis are horizontal. The entire vehicle weighs about 200 pounds. Through the design of improved drive means for the main drives and for the pivotal motion of the auxiliary chassis, the components can be sealed more economically than those of the prior art such that the present invention can be operated when submerged in liquids. Thus, this vehicle is very useful for many applications where larger and more complex devices cannot be used. Although specific construction is illustrated with regard to components of this vehicle, these are given as an illustration of a typical embodiment rather than as a limitation. Thus, the invention is to be limited only by the appended claims and their equivalents when taken in combination with this detailed description.

We claim:

1. An all terrain vehicle adapted for remote control operation in potentially hostile environments, including operation when submerged, which comprises:

a main chassis having a forward end and a rearward end, said main chassis equipped with a pair of rotatable sprocket wheels on each side thereon, at least one of said sprocket wheels on each side being driven, said pair of sprocket wheels on each side having a flexible, main track engaged therewith, said main tracks supporting and moving said vehicle on said terrain;

a first articulated auxiliary chassis pivotally mounted on said forward end of said main chassis, said first auxiliary chassis having a cantilevered arm on each side with a rotatable sprocket wheel at a distal end of each, and with a second sprocket wheel coupled with one of said sprocket wheels of said main chassis closest to said forward end, said distal end sprocket wheel and said sprocket wheel coupled with said drive sprocket wheel of said main chassis having a flexible first auxiliary track engaged therewith for further supporting and moving of said vehicle across said terrain, said cantilevered arms being joined by a cross-connecting torsion member attached to each of said arms at a point intermediate said sprocket wheels on each side whereby pivotal motion of one arm is transmitted to the second arm;

a second articulated auxiliary chassis pivotally mounted on said rearward end of said main chassis, said second auxiliary chassis having a cantilevered arm on each side with a rotatable sprocket wheel at a distal end of each, and with a second sprocket wheel coupled with one of said sprocket wheels of said main chassis closest to said rearward end, said distal end sprocket wheel and said sprocket wheel coupled with said drive sprocket wheel of said main chassis having a flexible second auxiliary track engaged therewith for further supporting and moving of said vehicle across said terrain, said cantilevered arms being joined by a cross-connecting torsion member attached to each of said arms at a point intermediate said sprocket wheels on each side whereby pivotal motion of one arm is transmitted to the second arm;

a first main chassis drive means mounted within said main chassis that has a drive motor means and gear means for rotating one of said sprocket wheels on one side of said main chassis and said coupled sprocket wheel of said first auxiliary chassis to cause rotation of one of said main tracks and rotation of said auxiliary tracks of said first and second auxiliary chassis on said one side, said first main chassis drive means including bearings and a seal to protect said bearings during operation;

a second main chassis drive means mounted within said main chassis diagonally from said first main chassis drive means, said second main chassis drive means having a drive motor means and gear means for rotating one of said sprocket wheels on a second side of said main chassis and said coupled sprocket wheel of said second auxiliary chassis to cause rotation of a second of said main tracks and rotation of said auxiliary tracks of said first and second auxiliary chassis on said second side, said second main chassis drive means including bearings and a seal to protect said bearings during operation;

a first auxiliary chassis drive means mounted within said main chassis having a motor means and gear means coupled to one of said arms of said first auxiliary chassis to produce pivotal movement of said first auxiliary chassis with respect to said main chassis, said first auxiliary chassis drive means including bearings and a seal to protect said bearings during operation of said vehicle;

a second auxiliary chassis drive means mounted within said main chassis diagonally opposite said first auxiliary chassis drive means, said second auxiliary chassis drive means having a motor means and gear means coupled to one arm of said second auxiliary chassis for pivotally moving said second auxiliary chassis with respect to said main chassis, said second auxiliary chassis drive means including bearings and a seal to protect said bearings during operation of said vehicle;

a manipulatable arm unit pivotally mounted on said main chassis, said arm unit having a shoulder joint providing for rotation about at least a horizontal axis relative to said main chassis, an elbow joint providing for rotation about a horizontal axis relative to said main chassis, an upper arm portion joining said shoulder joint with said elbow joint and a forearm portion attached at one end to said elbow joint, said forearm portion provided with adaptive means for releasable attachment of apparatus to carry out selected actions by said vehicle in said environment;

drive means mounted within said upper arm portion for producing individual selected movements of said shoulder and elbow joints; and circuit means within said main chassis and connected to said drive means of said main chassis, to said first and second auxiliary chassis, to said arm unit for remote operation of components of said vehicle.

2. The vehicle of claim 1 wherein said circuit means includes means for receiving remotely transmitted signals for said remote operation of components of said vehicle.

3. The vehicle of claim 2 wherein said means for receiving remotely transmitted signals is a cable means for conveying power and operating instructions to said vehicle.

4. The vehicle of claim 1 wherein said circuit means includes a battery pack means, and means for receiving wireless transmitted signals as operating instructions to said vehicle.

5. The vehicle of claim 1 wherein said gear means of said first and second drive means and said gear means of said first and second auxiliary drive means produces rotation of an output shaft with selected rotational speed and torque, said output shaft mounted in said bearing means with said seal means surrounding said output shaft.

6. An all terrain vehicle adapted for remote control operation in potentially hostile environments, including operation when submerged, which comprises:

a main chassis having a forward end and a rearward end, said main chassis equipped with a pair of rotatable sprocket wheels on each side thereon, at least one of said sprocket wheels on each side being driven, said pair of sprocket wheels on each side having a flexible main track engaged therewith, said main track supporting and moving said vehicle on said terrain;

a first articulated auxiliary chassis pivotally mounted on said forward end of said main chassis, said first auxiliary chassis having a cantilevered arm on each side with a rotatable sprocket wheel at a distal end of each, and with a second sprocket wheel coupled with one of said sprocket wheels of said main chassis closest to said forward end, said distal end sprocket wheel and said sprocket wheel coupled with said drive sprocket wheel of said main chassis having a flexible first auxiliary track engaged therewith for further supporting and moving of said vehicle across said terrain, said cantilevered arms being joined by a cross-connecting torsion member attached to each of said arms at a point intermediate said sprocket wheels on each side whereby pivotal motion of one arm is transmitted to the second arm;

a second articulated auxiliary chassis pivotally mounted on said rearward end of said main chassis, said second auxiliary chassis having a cantilevered arm on each side with a rotatable sprocket wheel at a distal end of each, and with a second sprocket wheel coupled with one of said sprocket wheels of said main chassis closest to said rearward end, said distal end sprocket wheel and said sprocket wheel coupled with said drive sprocket wheel of said main chassis having a flexible second auxiliary track engaged therewith for further supporting and moving of said vehicle across said terrain, said cantilevered arms being joined by a cross-connecting torsion member attached to each of said arms at a point intermediate said sprocket wheels on each side whereby pivotal motion of one arm is transmitted to the second arm;

a first main chassis drive means mounted within said main chassis that has a drive motor means and gear means for rotating one of said sprocket wheels on one side of said main chassis and said coupled sprocket wheel of said first auxiliary chassis to cause rotation of one of said main track and rotation of said auxiliary tracks of said first and second auxiliary chassis on said one side, said gear means of said first main chassis drive means producing a selected rotational speed and torque to an output shaft, bearings to rotatably support said output shaft and a seal to protect said bearings during operation;

a second main chassis drive means mounted within said main chassis diagonally from said first main chassis drive means, said second main chassis drive means having a drive motor means and gear means for rotating one of said sprocket wheels on a second side of said main chassis and said coupled sprocket wheel of said second auxiliary chassis to cause rotation of a second of said main tracks and rotation of said auxiliary tracks of said first and second auxiliary chassis on said second side, said gear means of said second main chassis drive means producing a selected rotational speed and torque to an output shaft, bearings to rotatably support said output shaft and a seal to protect said bearings during operation;

a first auxiliary chassis drive means mounted within said main chassis having a motor means and gear means coupled to one of said arms of said first auxiliary chassis to produce pivotal movement of said first auxiliary chassis with respect to said main chassis, said gear means of first auxiliary chassis drive means producing a selected rotational speed and torque to an output shaft, bearings to rotatably support said shaft and a seal to protect said bearings during operation of said vehicle;

a second auxiliary chassis drive means mounted within said main chassis diagonally opposite said first auxiliary chassis drive means, said second auxiliary chassis drive means having a motor means and gear means coupled to one arm of said second auxiliary chassis for pivotally moving said second auxiliary chassis with respect to said main chassis, said gear means of said second auxiliary chassis drive means providing a selected rotational speed and torque to an output shaft, bearings to rotatably support said shaft and a seal to protect said bearings during operation of said vehicle;

a manipulatable arm unit pivotally mounted on said main chassis, said arm unit having a shoulder joint providing for rotation about at least a horizontal axis relative to said main chassis, an elbow joint providing for rotation about a horizontal axis relative to said main chassis, an upper arm portion joining said shoulder joint to said elbow joint and a forearm portion attached at one end to said elbow joint, said forearm portion provided with adaptive means for releasable attachment of apparatus to carry out selected actions by said vehicle in said environment;

drive means mounted within said upper arm portion for producing individual selected movements of said shoulder and elbow joints;

viewing means connected to said main chassis oriented toward said forward end, said viewing means including illumination means and TV camera means; and circuit means within said main chassis and connected to said drive means of said main chassis, to said first and second auxiliary chassis, to said arm unit and to said viewing means for remote operation of components of said vehicle.

7. The vehicle of claim 6 wherein said circuit means includes means for receiving remotely transmitted signals for said remote operation of components of said vehicle.

8. The vehicle of claim 7 wherein said means for receiving remotely transmitted signals is a cable means connected to said main chassis for conveying power and operating instructions to said vehicle.

9. The vehicle of claim 6 wherein said circuit means includes a battery pack means, and means for receiving wireless transmitted signals as operating instructions to said vehicle.

* * * * *